(12) United States Patent
Natsume (10) Patent No.: US 8,347,448 B2
(45) Date of Patent: Jan. 8, 2013

(54) WIPER SYSTEM

(75) Inventor: Takashi Natsume, Toyohashi (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 604 days.

(21) Appl. No.: 12/591,695

(22) Filed: Nov. 30, 2009

(65) Prior Publication Data

US 2010/0139025 A1 Jun. 10, 2010

(30) Foreign Application Priority Data

Dec. 9, 2008 (JP) .................................. 2008-313192

(51) Int. Cl.
*B60S 1/08* (2006.01)
(52) U.S. Cl. ..................... 15/250.17; 15/250.3; 318/443; 318/444; 318/DIG. 2
(58) Field of Classification Search ............... 15/250.16, 15/250.17, 250.3; 318/443, 444, DIG. 2, 318/430

See application file for complete search history.

(56) References Cited

U.S. PATENT DOCUMENTS

| | | | |
|---|---|---|---|
| 6,359,407 B1 * | 3/2002 | Michenfelder et al. | 318/443 |
| 6,851,157 B2 * | 2/2005 | Zimmer | 15/250.13 |
| 7,355,360 B2 | 4/2008 | Assan | |
| 7,895,702 B2 * | 3/2011 | Tisch et al. | 15/250.17 |
| 2003/0173923 A1 | 9/2003 | Nazione, Jr. et al. | |
| 2006/0113942 A1 | 6/2006 | Amagasa | |

FOREIGN PATENT DOCUMENTS

JP A-2000-52934 2/2000

* cited by examiner

*Primary Examiner* — Gary Graham
(74) *Attorney, Agent, or Firm* — Posz Law Group, PLC (57) ABSTRACT

An output shaft of a wiper motor is connected to a wiper to transmit a rotational force of the wiper motor to the wiper to reciprocally swing the wiper between an upper return position and a lower return position in response to forward and backward rotations of the output shaft upon energization of the wiper motor. When the wiper is stopped at the lower return position, the control unit executes a stop position holding control operation in such a manner that the control unit controls a rotational direction of the wiper motor to apply a rotational force to the wiper in a downward direction and controls the rotational force of the wiper motor based on a speed of the vehicle to substantially maintain the wiper at the lower return position.

4 Claims, 7 Drawing Sheets

WIPER SYSTEM

CROSS REFERENCE TO RELATED APPLICATION

This application is based on and incorporates herein by reference Japanese Patent Application No. 2008-313192 filed on Dec. 9, 2008 and Japanese Patent Application No. 2009-255115 filed on Nov. 6, 2009.

BACKGROUND OF THE INVENTION

1. Field of the Invention

The present invention relates to a wiper system and a wiper control method.

2. Description of Related Art

For example, Japanese Unexamined Patent Publication No. 2004-189197A (corresponding to US 2006/0113942A1) discloses a control method of a wiper system. According to this control method, a wiper is reciprocally swung between an upper return position and a lower return position over a front glass of a vehicle.

However, according to the control method of the wiper system recited in Japanese Unexamined Patent Publication No. 2004-189197A, in the state where the wiper is stopped at the lower return position, when the speed of the vehicle is increased to cause an increase in the head wind applied to the vehicle, the wind pressure, which is generated by this head wind, may possibly lift the wiper from the lower return position toward the upper return position.

SUMMARY OF THE INVENTION

The present invention addresses the above disadvantage. According to the present invention, there is provided a wiper system for a vehicle, including a wiper, a wiper motor and a control unit. The wiper is supported by a body of the vehicle in a swingable manner to wipe a front glass of the vehicle. The wiper motor has an output shaft, which is connected to the wiper to transmit a rotational force of the wiper motor to the wiper to reciprocally swing the wiper between an upper return position and a lower return position in response to forward and backward rotations of the output shaft upon energization of the wiper motor. The control unit controls the wiper motor. When the wiper is stopped at the lower return position, the control unit executes a stop position holding control operation in such a manner that the control unit controls a rotational direction of the wiper motor to apply a rotational force to the wiper in a downward direction and controls the rotational force of the wiper motor based on a speed of the vehicle to substantially maintain the wiper at the lower return position.

There is also provided a wiper control method. According to the wiper control method, it is determined whether a wiper, which is reciprocally swung between an upper return position and a lower return position in response to forward and backward rotations of an output shaft of a wiper motor upon energization of the wiper motor to wipe a front glass of the vehicle, is stopped at the lower return position. Then, a rotational direction of the wiper motor is controlled to apply a rotational force to the wiper in a downward direction and also controlling the rotational force of the wiper motor based on a speed of the vehicle to substantially maintain the wiper at the lower return position when it is determined that the wiper is stopped at the lower return position in the determining of whether the wiper is stopped at the lower return position.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to the accompanying drawings.

Figure 1:
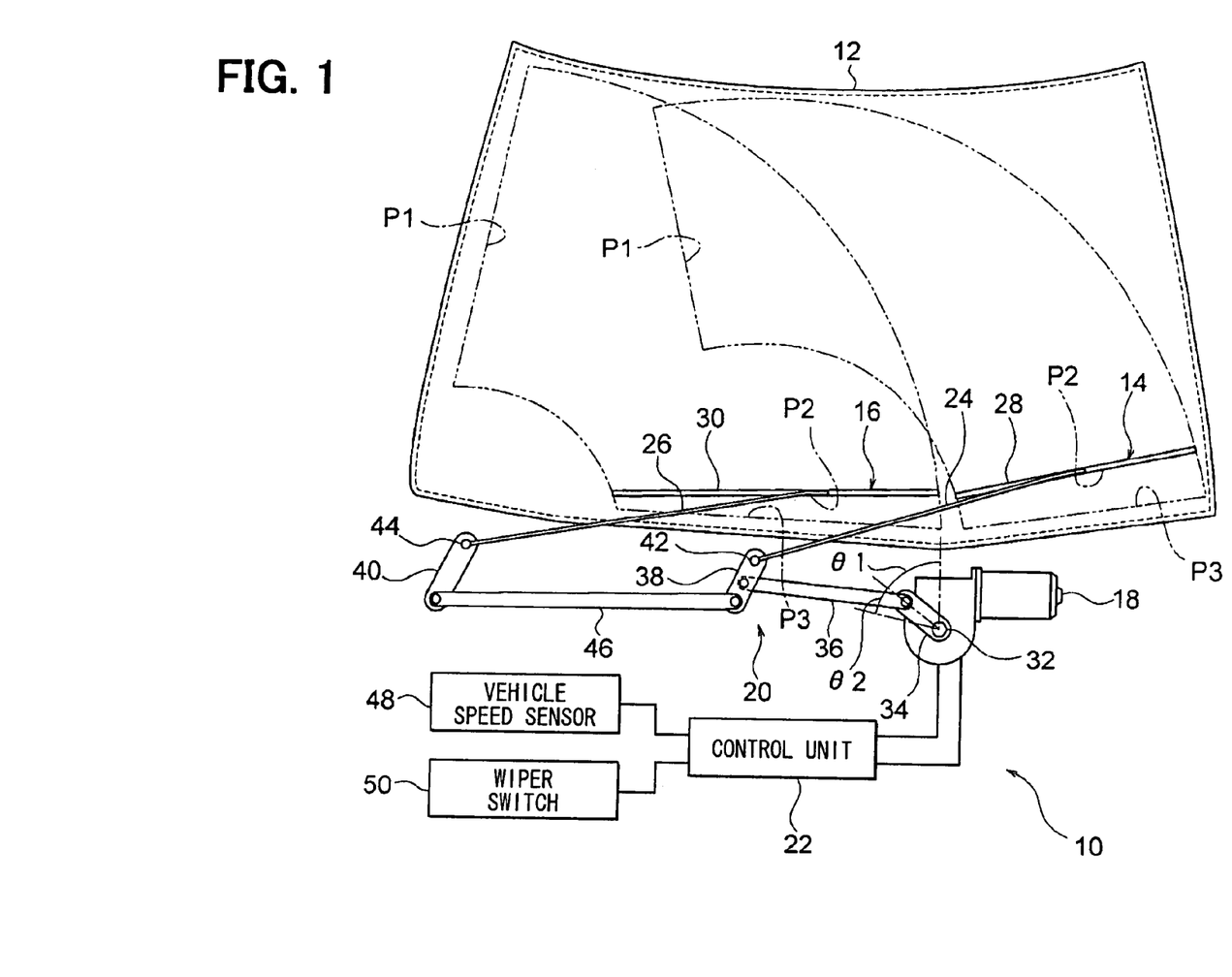
FIG. 1 is a schematic diagram showing an entire structure of a wiper system according to an embodiment of the present invention.
Figure 2:
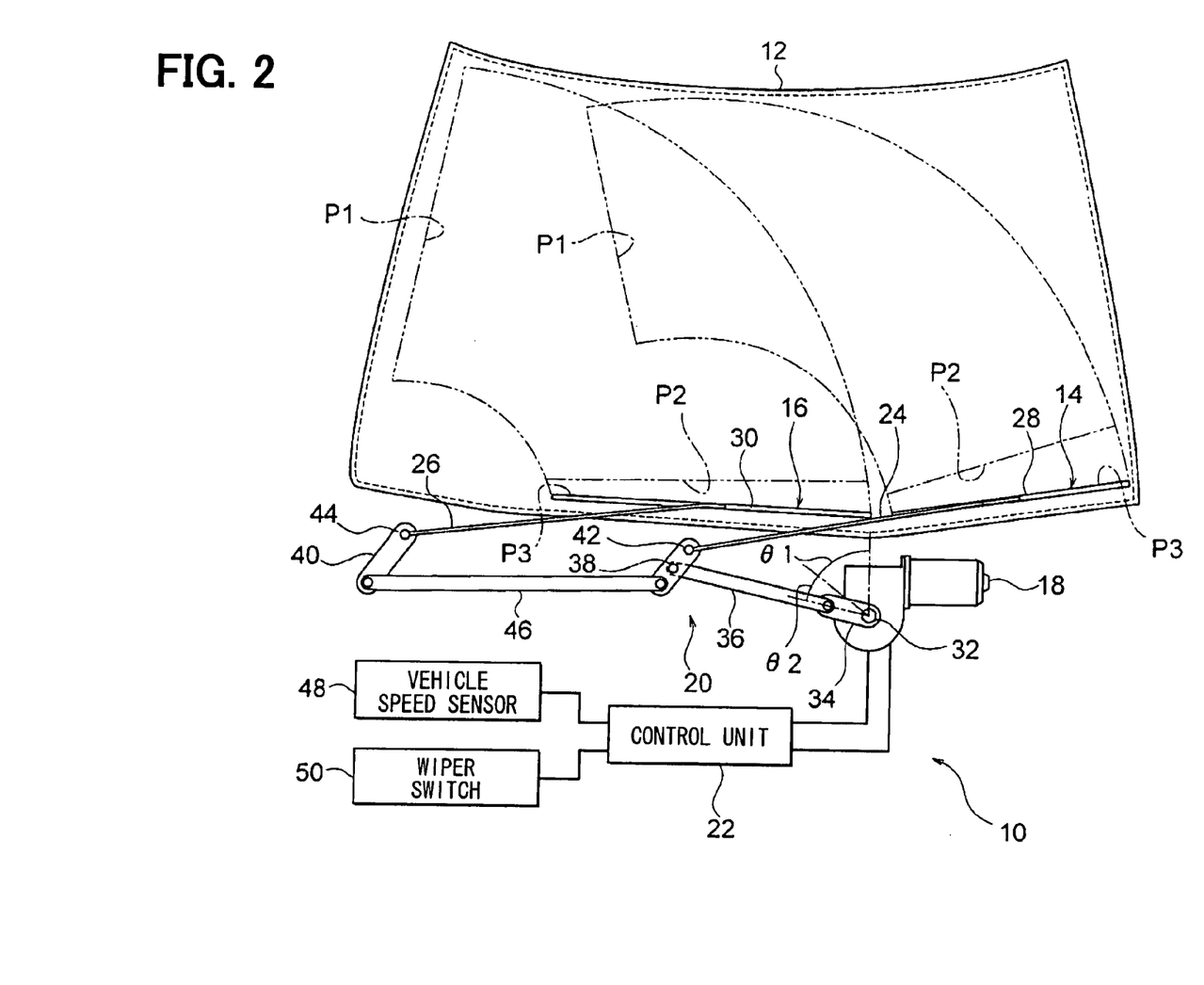
FIG. 2 is a schematic diagram similar to FIG. 1, showing wipers of the wiper system of FIG. 1 placed in a park position thereof.

FIGS. 1 and 2 show a wiper system 10 according to an embodiment of the present invention. The wiper system 10 wipes a front glass (also referred to as a windshield) 12 of a vehicle (e.g., an automobile) and includes two wipers 14, 16, a wiper motor 18, a link mechanism 20 and a control unit 22.

Each wiper 14, 16 includes a wiper arm 24, 26 and a wiper blade 28, 30. A base end portion of the wiper arm 24, 26 is fixed to a corresponding one of two pivot shafts 42, 44, and the wiper blade 28, 30 is fixed to a distal end portion of the wiper arm 24, 26.

When the wiper arm 24, 26 is swung, the wiper 14, 16 is reciprocally driven along the front glass 12 to wipe the same.

The wiper motor 18 has an output shaft 32, which is rotatable in both a forward rotational direction and a backward rotational direction. The link mechanism 20 includes a crank arm 34, a first link rod (also simply referred to as a link rod) 36, two pivot levers 38, 40, the two pivot shafts 42, 44 and a second link rod 46.

One end portion of the crank arm 34 is fixed to the output shaft 32, and the other end portion of the crank arm 34 is rotatably connected to one end portion of the first link rod 36. The other end portion of the first link rod 36 is rotatably connected to one end portion of the pivot lever 38. Two opposed ends of the second link rod 46 are rotatably connected to the one end portions, respectively, of the pivot levers 38, 40.

Each pivot shaft 42, 44 is rotatably supported by a corresponding pivot holder (not shown), which is provided to a vehicle body. The other end portion of each pivot lever 38, 40 is fixed to the corresponding pivot shaft 42, 44.

In this wiper system 10, when the output shaft 32 is reciprocally rotated forward and backward within a first rotational angular range 01, the rotational force of the output shaft 32 is transmitted to the wiper arms 24, 26 through the link mechanism 20 to reciprocally swing the wiper arms 24, 26. When each wiper arm 24, 26 is reciprocally swung, the corresponding wiper blade 28, 30 is reciprocally swung between an upper return position P1 and a lower return position P2 on the front glass 12.

Furthermore, in this wiper system 10, when the output shaft 32 is reciprocally rotated forward and backward in a second rotational angular range 02, the wiper blade 28, 30 is displaced between the lower return position P2 and a park position P3 located below the lower return position P2.

In the following description, when the wiper blade 28, 30 is sequentially placed in the upper return position P1, the lower return position P2 and the park position P3, it is assumed or said that the wiper 14, 16 itself is sequentially placed in the upper return position P1, the lower return position P2 and the park position P3, respectively, for the descriptive purpose.

In the wiper system 10, as shown in FIG. 2, when the wiper 14, 16 is placed in the park position P3, the crank arm 34 and the first link rod 36 are aligned to extend generally along an imaginary straight line.

The control unit 22 includes, for example, an input circuit, an electronic control unit (ECU) and a drive circuit and is connected to a vehicle speed sensor 48, a wiper switch 50 and the wiper motor 18.

The vehicle speed sensor 48 outputs a signal that corresponds to a speed (a travel speed) of the vehicle, which has the front glass 12 and the wiper system 10 described above.

The wiper switch 50 is operable by a driver of the vehicle to place the wiper switch 50 into one of a low speed mode position, a high speed mode position, an intermittent mode position and a park (stop) mode position and outputs a signal, which corresponds to the selected mode position of the wiper switch 50 that is selected by the driver.

In the wiper system 10, when the signal, which corresponds to the selected mode position, of the wiper switch 50, is supplied from the wiper switch 50 to the control unit 22, the control unit 22 is changed to the corresponding mode, which corresponds to the output signal of the wiper switch 50.

When the control unit 22 is changed to the intermittent mode or the park mode, the control unit 22 controls the wiper motor 18 based on the signal outputted from the vehicle speed sensor 48.

The intermittent mode is a mode for intermittently driving each wiper 14, 16 to swing the wiper 14, 16 between the upper return position P1 and the lower return position P2. The park mode is a mode for driving each wiper 14, 16 to the park position P3 after temporarily stopping the wiper 14, 16 at the lower return position P2. Furthermore, the low speed mode and the high speed mode are the same as those of a well known wiper system and thereby will not be described further for the sake of simplicity.

Now, a wiper control method of the wiper system 10 will be described.

Figure 3:
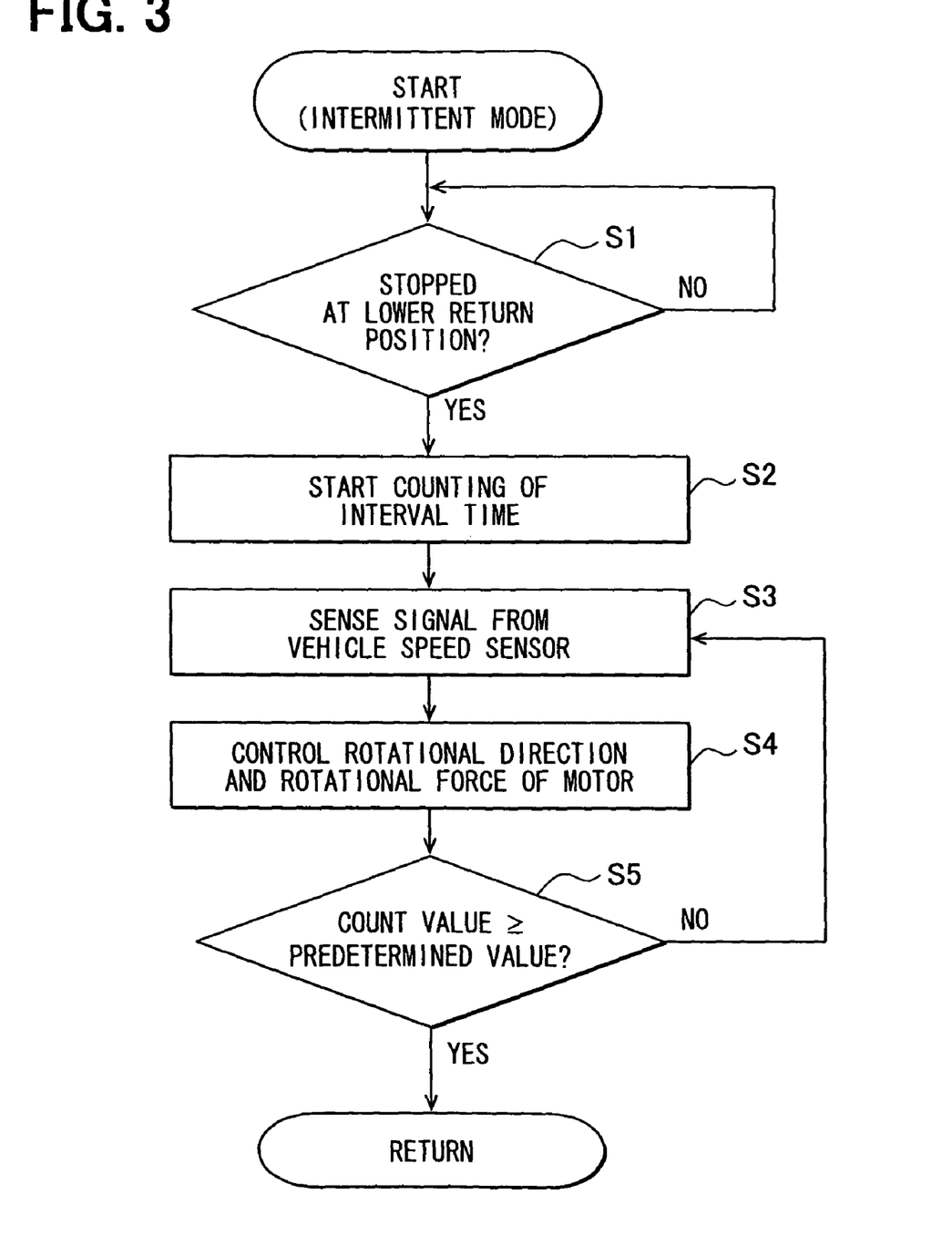
FIG. 3 is a flowchart showing an operation of the wiper system of FIG. 1 at the time of operating a control unit of the wiper system in an intermittent mode.

FIG. 3 is a flowchart showing the operation of the wiper system 10 at the time of operating the control unit 22 in the intermittent mode.

First of all, at step S1, the control unit 22 determines whether the wiper 14, 16 is stopped at the lower return position P2 based on, for example, a signal, which is outputted from a rotation sensing switch provided in the wiper motor 18 (serving as a stop determining step of determining whether the wiper 14, 16 is stopped at the lower return position P2).

When it is determined that the wiper 14, 16 is stopped at the lower return position P2 at step S1 (i.e., YES at step S1), the control unit 22 proceeds to step S2. At step S2, the control unit 22 starts counting of interval time, i.e., starts clocking the interval time. Then, the control unit 22, proceeds to step S3 where the control unit 22 senses the signal outputted from the vehicle speed sensor 48.

Next, the control unit 22 proceeds to step S4. At step S4, the control unit 22. controls the rotational direction of the wiper motor 18 such that the rotational force is applied to the wiper 14, 16 in the downward direction, and the control unit 22 also controls the rotational force of the wiper motor 18 in response to the speed of the vehicle measured with the vehicle speed sensor 48 in such a manner that the wiper 14, 16 is substantially maintained at the lower return position P2 (serving as a motor controlling step of controlling the rotational direction and the rotational force of the wiper motor and also serving as a stop position holding control operation).

The control unit 22 controls the rotational direction of the wiper motor 18 by controlling an energization pattern (a current supply pattern) of a pulse width modulation (PWM) signal, which is outputted from the control unit 22 to the wiper motor 18. The control unit 22 controls the rotational force of the wiper motor 18 by controlling a duty ratio of the PWM signal, which is outputted from the control unit 22 to the wiper motor 18.

Figure 5:
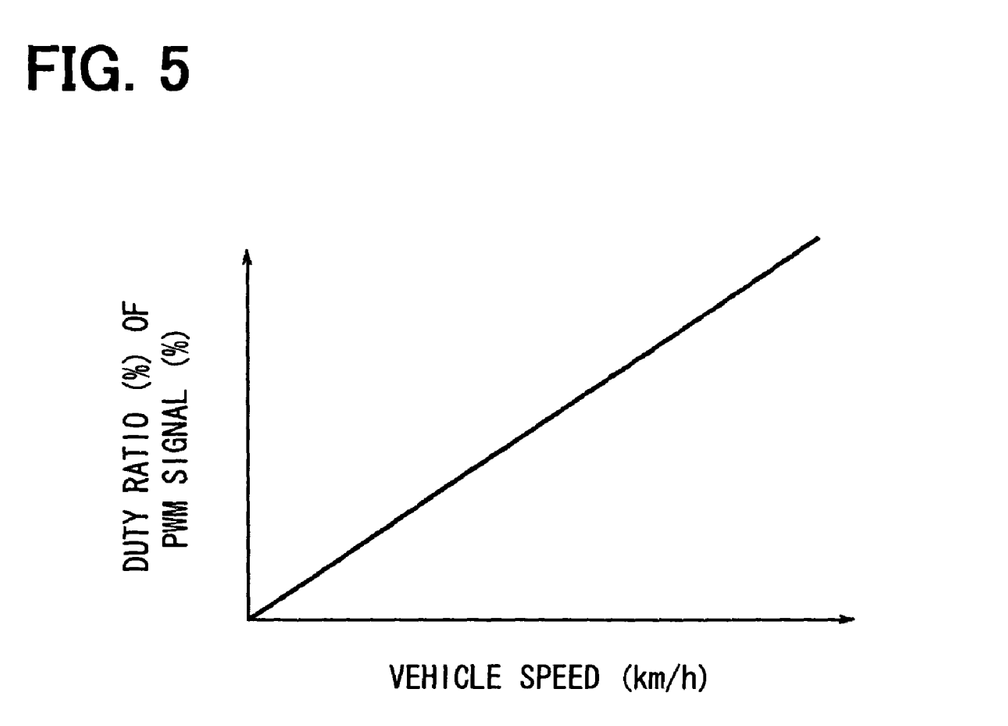
FIG. 5 is a diagram showing a relationship between a duty ratio of a PWM signal outputted to a wiper motor of the wiper system shown in FIG. 1 and a speed of the vehicle.

The control unit 22 increases the rotational force of the wiper motor 18 when the head wind, which is applied to the traveling vehicle, is increased due to an increase in the speed of the vehicle. Contrary to this, the control unit 22 decreases the rotational force of the wiper motor 18 when the head wind, which is applied to the traveling vehicle, is reduced due to a decrease in the speed of the vehicle. Specifically, as shown in FIG. 5, a duty ratio of the PWM signal, which is outputted to the wiper motor 18, is proportional to the speed (vehicle speed) of the vehicle. Furthermore, the duty ratio of this PWM signal is set to be smaller than the duty ratio immediately before starting of the movement of the wiper 14, 16.

Figure 6:
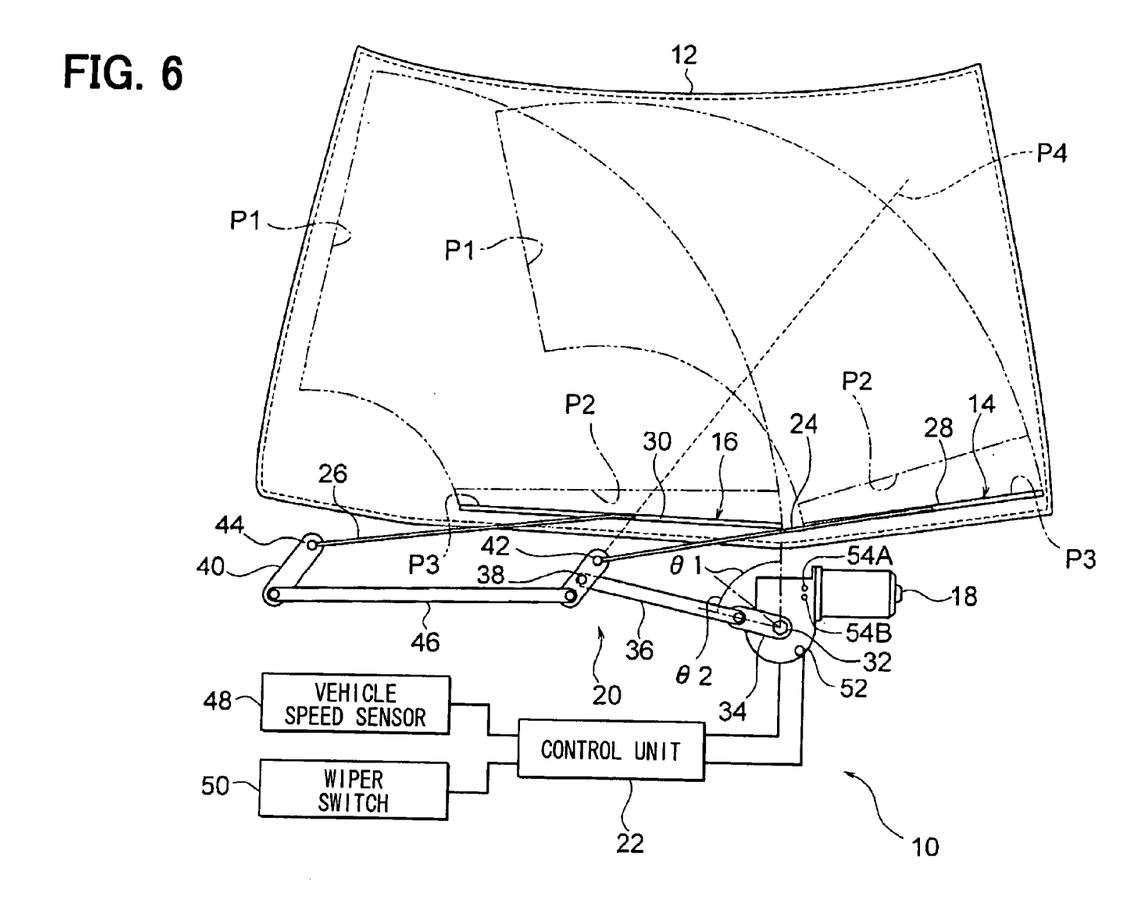
FIG. 6 is a schematic diagram similar to FIG. 1, indicating an exemplary operation executed by the control unit.

Now, an exemplary operation of the control unit 22 at step S4 will be described. For example, as shown in FIG. 6, an absolute position sensor (a reference position sensor) 52 is provided in a gear housing of the wiper motor 18 to sense a predetermined reference position P4, which is located between the lower return position P2 and the upper return position P1 of the wiper 14, 16. Also, two relative position sensors 54A, 54B are provided in the wiper motor 18 to sense the relative position of the wiper 14, 16 with respect to the reference position P4 of the wiper 14, 16. These sensors 52, 54A, 54B are connected to the control unit 22, so that the control unit 22 can obtain the measurement signals from these sensors 52, 54A, 54B. That is, the control unit 22 monitors the measurement signals of these sensors 52, 54A, 54B, so that the control unit 22 can recognize (determine) the state of the wiper 14, 16, which is indicated by the measurement signals of the sensors 52, 54A, 54B.

A magnet is provided to a gear of a speed reducing gear mechanism received in the gear housing of the wiper motor 18. The absolute position sensor 52 has a sensing element, such as a Hall IC, to sense a magnetic field (a magnetic force) that is generated from the magnet provided to the gear. Specifically, the, absolute position sensor 52 converts the sensed magnetic field into a corresponding electric current and then outputs this electric current as the measurement signal.

Figure 7:
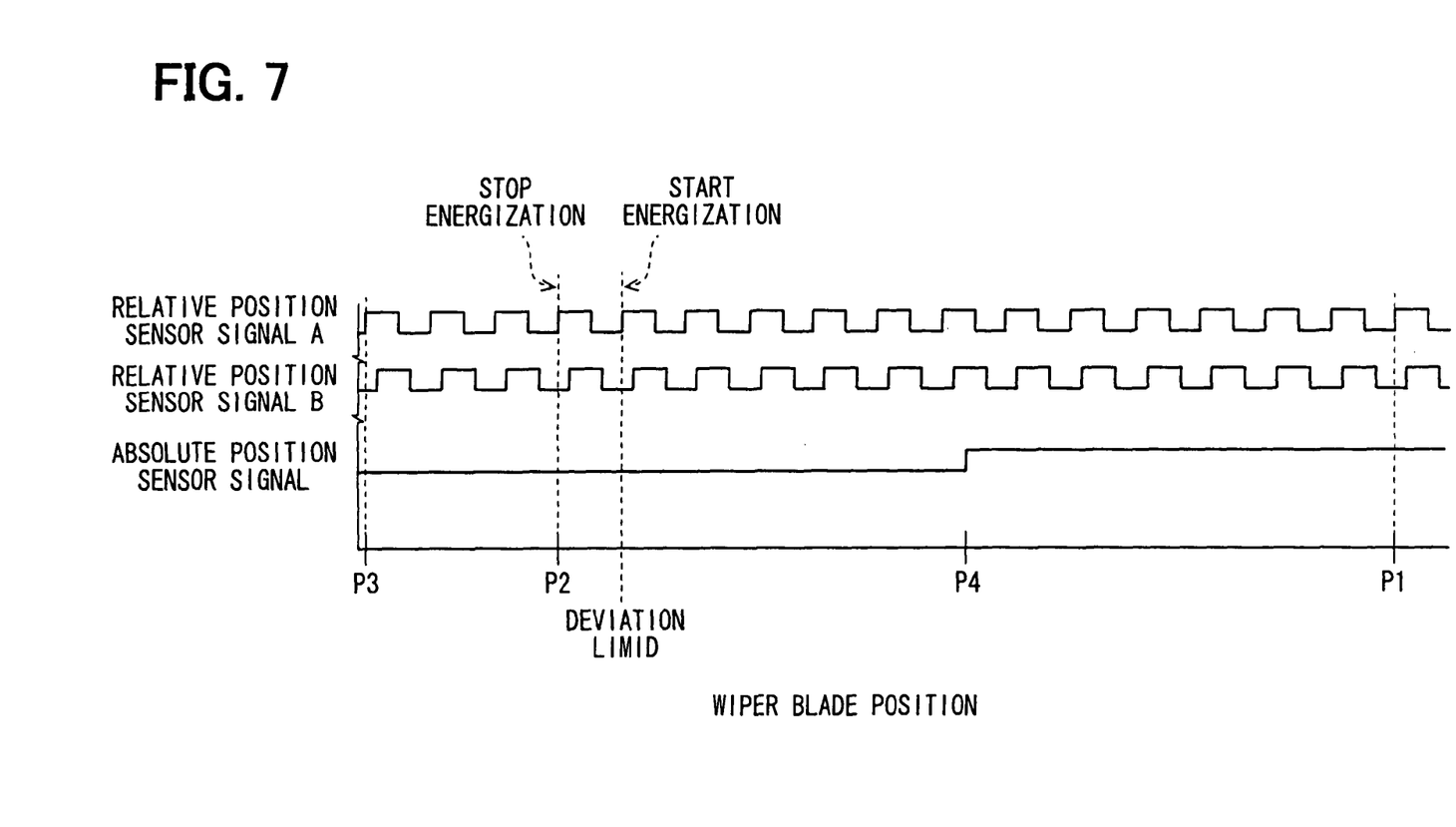
FIG. 7 is a diagram indicating the exemplary operation executed by the control unit of the wiper system of FIG. 1.

In the present embodiment, the magnet is positioned such that a level of the measurement signal (an absolute position sensor signal), which is outputted from the absolute position sensor 52, is changed when the wiper 14, 16 is placed in the predetermined reference position P4, as shown in FIG. 7. Specifically, the control unit 22 can recognize (determine) whether the wiper 14, 16 is located in the reference position P4 based on the measurement signal, which is outputted from the absolute position sensor 52. Here, it should be understood that the swing movement of the wiper 14, 16 is synchronized with the rotational movement of gear.

A sensor magnet, which is different from the magnet fixed to the gear of the speed reducing gear mechanism, is securely fixed to a rotatable shaft of an armature of the wiper motor 18, which is connected to the output shaft 32 to drive the same through the speed reducing gear mechanism, so that the sensor magnet is rotated integrally with the rotatable shaft. Each of the relative position sensors 54A, 54B has a sensing element, such as a Hall IC to sense the magnetic field generated from the sensor magnet. The relative position sensors 54A, 54B output the measurement signals (a relative position sensor signal A and a relative position sensor signal B shown in FIG. 7), respectively, by converting the sensed magnetic field generated from the sensor magnet into the corresponding electric currents, as shown in FIG. 7. The relative position sensors 54A, 54B are arranged such that a phase of the measurement signal (the relative position sensor signal A) of the relative position sensor 54A is shifted from a phase of the measurement signal (the relative position sensor signal B) of the relative position sensor 54B (see FIG. 7). The control unit 22 recognizes (determines) the rotational direction and the rotational position of the sensor magnet, which is fixed to the rotatable shaft of the wiper motor 18, based on the measurement signals outputted from the relative position sensors 54A, 54B. The control unit 22 recognizes (determines) the rotational direction and the rotational position of the rotatable shaft of the wiper motor 18 as well as the moving direction of the wiper 14, 16 based on the rotational direction and the rotational position of the sensor magnet, which is recognized (determined) in the above described manner. Here, it should be understood that the rotational movement of the sensor magnet, the rotational movement of the rotatable shaft of the wiper motor 18 and the swing movement of the wiper 14, 16 are synchronized with each other.

The control unit 22 further includes an undepicted storage device, which serves as a storage means, such as a read only memory (ROM), a random access memory (RAM), a hard disk drive (HDD). The storage device stores the pulses of the relative position sensor signals A, B from the reference position P4 to the lower return position P2 as well as the pulses of the relative position sensor signals A, B from the reference position P4 to the upper return position P1. These pulses may be obtained in advance through, for example, experiments to know the corresponding respective positions of the wiper 14, 16. The control unit 22 determines whether the position of the wiper 14, 16 is in the lower return position P2 and also determines whether the position of the wiper 14, 16 is in the upper return position P1 based on the relative position sensor signals A, B and the pulses (the count value of the pulse number) stored in the storage device.

At step S4, the control unit 22, which is constructed in the above described manner, controls the rotational direction of the wiper motor 18 to apply the rotational force to the wiper 14, 16 in the downward direction, and the control unit 22 also controls the rotational force of the wiper motor 18 in response to the speed of the vehicle in such a manner that the wiper 14, 16 is substantially maintained at the lower return position P2. Also, with reference to FIG. 7, the control unit 22 monitors the position of the wiper 14, 16 based on a count value, which is obtained by counting the relative position sensor signals A, B, to limit the deviation of the position of the wiper 14, 16 from the lower return position P2 though use of the rotational force of the wiper motor 18 (the motor controlling step, the stop position holding control operation).

When the position of the wiper 14, 16 is deviated from the lower return position P2 and reaches (or exceeds beyond) a deviation limit of, for example, FIG. 7, the rotational direction and the rotational force of the wiper motor 18 may be controlled to place the wiper 14, 16 into the lower return position P2. In such a case, for example; the PWM signal having the duty ratio, which corresponds to the vehicle speed at the time of reaching the deviation limit, may be outputted from the control unit 22 to the wiper motor 18 (starting the energization of the wiper motor 18). Then, when the count value of the pulse number of the relative position sensor signals A, B becomes a value, which indicates the lower return position P2, i.e., when the position of the wiper 14, 16 coincides with the lower return position P2, the output of the PWM signal to the wiper motor 18 may be stopped (stopping the energization of the wiper motor 18).

Then, at step S5, the control unit 22 determines whether the count value of the interval time is equal to or larger than a predetermined value. When it is determined that the count value of the interval time is less than the predetermined value at step S5, the control unit returns to step S3. Contrary to this, when it is determined that the count value of the interval time is equal to or larger than the predetermined value at step S5, the control unit 22 returns to step S1 after driving the wiper 14, 16 for one cycle (i.e., driving the wiper 14, 16 to the upper return position P1 and then back to the lower return position P2 once).

Figure 4:
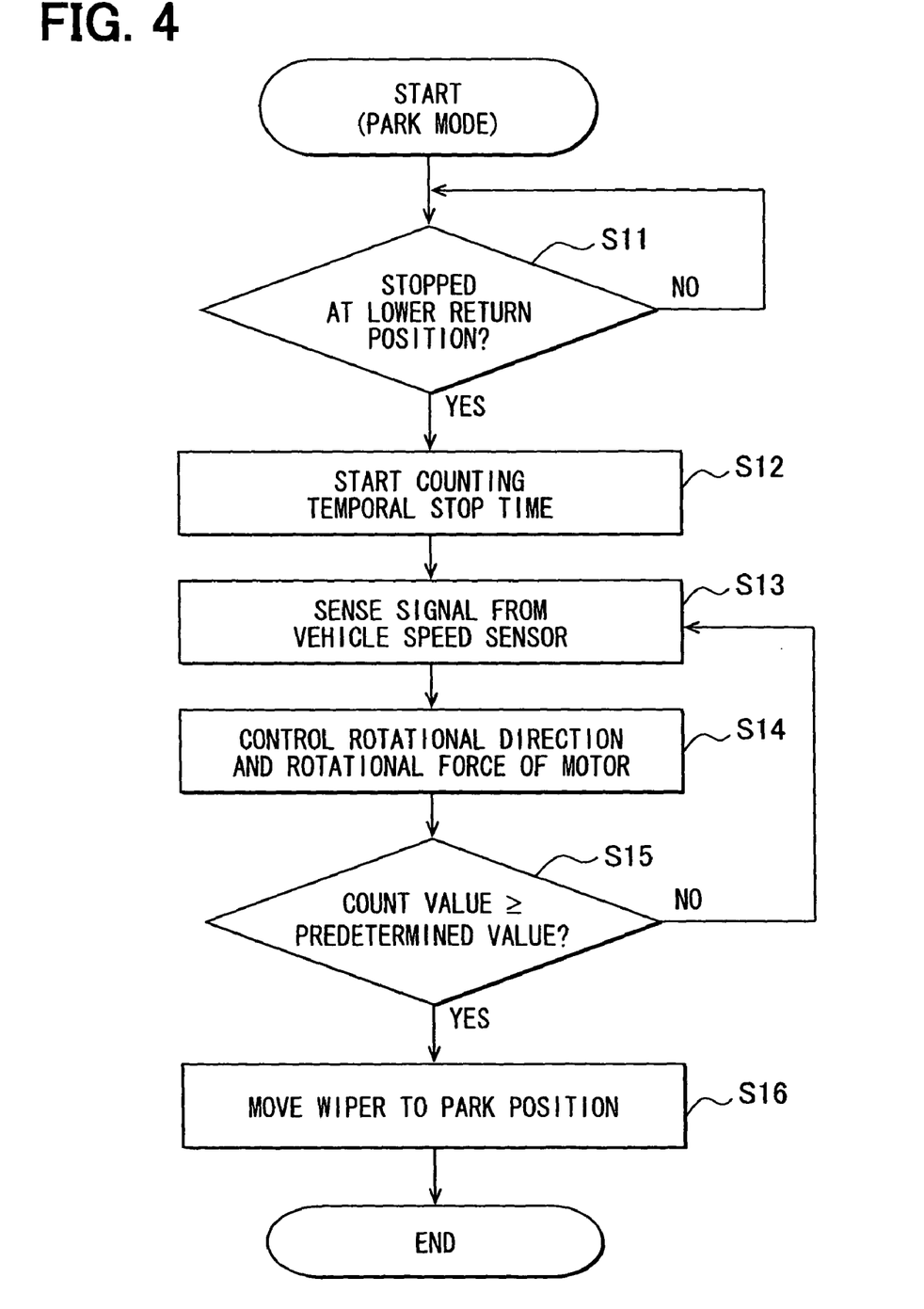
FIG. 4 is a flowchart showing an operation of the wiper system of FIG. 1 at the time of operating the control unit of the wiper system in a park mode.

FIG. 4 is a flowchart showing the operation of the wiper system 10 at the time of operating the control unit 22 in the park mode.

First of all, at step S11, the control unit 22 determines whether the wiper 14, 16 is stopped at the lower return position P2 based on, for example, the signal, which is outputted from the rotation sensing switch provided in the wiper motor 18 (the stop determining step).

When it is determined that the wiper 14, 16 is stopped at the lower return position P2 at step S11 (i.e., YES at step S11), the control unit 22 proceeds to step S12. At step S12, the control unit 22 starts counting of temporal stop time, i.e., starts clocking the temporal stop time. Then, the control unit 22 proceeds to step S13 where the control unit 22 senses the signal outputted from the vehicle speed sensor 48.

Next, the control unit 22 proceeds to step S14. At step S14, the control unit 22 controls the rotational direction of the wiper motor 18 such that the rotational force is applied to the wiper 14, 16 in the downward direction, and the control unit 22 also controls the rotational force of the wiper motor 18 based on the speed of the vehicle measured with the vehicle speed sensor 48 in such a manner that the wiper 14, 16 is substantially maintained at the lower return position P2 (serving as the motor controlling step of controlling the rotational direction and the rotational force of the wiper motor and also serving as the stop position holding control operation).

This step S14 is similar to step S4 of the intermittent mode described above.

Then, at step S15, the control unit 22 determines whether the count value of the temporal stop time is equal to or larger than a predetermined value. When it is determined that the count value of the temporal stop time is smaller than the predetermined value at step S15, the control unit 22 returns to step S13. Contrary to this, when it is determined that the count value of the temporal stop time is equal to or larger than the predetermined value at step S15, the control unit 22 proceeds to step S16. At step S16, the control unit 22 controls the wiper motor 18 in such a manner that the wiper 14, 16 is moved from the lower return position P2 to the park position P3, and then the control unit 22 terminates the current operation.

Next, advantages of the present embodiment will be described.

As discussed above, in the wiper system 10 of the present embodiment, in the case where the wiper 14, 16 is driven in the intermittent mode or is moved to the park position P3 upon temporarily stopping the wiper 14, 16 at the lower return position P2, when the wiper. 14, 16 is stopped at the lower return position P2, the rotational direction of the wiper motor 18 is controlled such that the rotational force is applied to the wiper 14, 16 in the downward direction, i.e., the rotational direction of the wiper motor 18 is controlled to apply the rotational force to the wiper 14, 16 in the downward direction. In this way, it is possible to limit the upward lifting of the wiper 14, 16 from the lower return position P2 toward the upper return position P1 caused by the wind pressure of the head wind, which is applied to the traveling vehicle.

Also, the rotational force of the wiper motor 18 is controlled based on the speed of the vehicle in such a manner that the wiper 14, 16 is substantially maintained at the lower return position P2, i.e., the rotational force of the wiper motor 18 is controlled based on the speed of the vehicle measured with the vehicle speed sensor 48 to substantially maintain the wiper 14, 16 at the lower return position P2. Specifically, when the head wind is increased upon the increase of the speed of the vehicle, the rotational force of the wiper motor 18 is increased. Furthermore, when the head wind is decreased upon the decrease of the speed of the vehicle, the rotational force of the wiper motor 18 is decreased. In this way, even in the case where the wind pressure, which is applied to the traveling vehicle by the head wind, is changed due to the change in the speed of the vehicle, it is possible to substantially maintain the wiper 14, 16 at the lower return position P2.

Also, in the case of the wiper system 10 of the present embodiment, when the wiper 14, 16 is placed in the park position P3, the crank arm 34 and the first link rod 36 are aligned to extend generally along the straight line, as shown in FIG. 2. Therefore, even when the head wind is applied to the traveling vehicle to cause the application of the wind pressure to the wiper 14, 16, which is placed at the park position P3, the crank arm 34 is not rotated. Thereby, the upward lifting of the wiper 14, 16 from the park position P3 toward the upper return position P1 can be further limited.

The embodiment of the present invention has been described above. However, the present invention is not limited to the above embodiment, and the above embodiment may be modified in various ways, without departing from the spirit and scope of the present invention.

For example, in the above embodiment, the output shaft 32 of the wiper motor 18 is connected to the wipers 14, 16 through the link mechanism 20 to transmit the rotational force. Alternatively, the output shaft 32 of the wiper motor 18 may be directly connected to the wipers 14, 16.

What is claimed is:

1. A wiper system for a vehicle, comprising:
    a wiper that is supported by a body of the vehicle in a swingable manner to wipe a front glass of the vehicle;
    a wiper motor that has an output shaft, which is connected to the wiper to transmit a rotational force of the wiper motor to the wiper to reciprocally swing the wiper between an upper return position and a lower return position in response to forward and backward rotations of the output shaft upon energization of the wiper motor; and
    a control unit that controls the wiper motor, wherein when the wiper is stopped at the lower return position, the control unit executes a stop position holding control operation in such a manner that the control unit controls a rotational direction of the wiper motor to apply a rotational force to the wiper in a downward direction and controls the rotational force of the wiper motor based on a speed of the vehicle to substantially maintain the wiper at the lower return position.

2. The wiper system according to claim 1, wherein when the wiper is stopped at the lower return position in an intermittent mode, in which the wiper is intermittently driven to swing the wiper between the upper return position and the lower return position, the control unit executes the stop position holding control operation.

3. The wiper system according to claim 1, wherein:
    the wiper motor is operable to displace the wiper to a park position, which is located on a lower side of the lower return position in response to rotation of the output shaft; and
    when the wiper is stopped at the lower return position in a park mode, in which the wiper is moved to the park position after temporarily stopping the wiper at the lower return position, the control unit executes the stop position holding control operation.

4. The wiper system according to claim 1, further comprising:
    a crank arm that has one end portion, which is fixed to the output shaft;
    a link rod that has one end portion, which is rotatably connected to the other end portion of the crank arm;
    a pivot lever that has one end portion, which is rotatably connected to the other end portion of the link rod; and
    a pivot shaft that is rotatably supported by the body of the vehicle and is fixed to the other end portion of the pivot lever, wherein the wiper is fixed to the pivot shaft, and the crank arm and the link rod are aligned to extend generally along an imaginary straight line when the wiper is placed in the park position.

* * * * *